(12) United States Patent
Katoh et al.

(10) Patent No.: US 12,043,264 B2
(45) Date of Patent: Jul. 23, 2024

(54) INFORMATION PROCESSING DEVICE, VEHICLE, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Tatsunori Katoh, Nagoya (JP); Hiroyasu Hadano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 330 days.

(21) Appl. No.: 17/514,658

(22) Filed: Oct. 29, 2021

(65) Prior Publication Data

US 2022/0234592 A1    Jul. 28, 2022

(30) Foreign Application Priority Data

Jan. 22, 2021  (JP) ................................ 2021-008756

(51) Int. Cl.
  *B60W 40/00*   (2006.01)
  *B60W 40/08*   (2012.01)
  *G06V 20/59*   (2022.01)

(52) U.S. Cl.
  CPC .......... *B60W 40/08* (2013.01); *G06V 20/593* (2022.01); *B60W 2040/0881* (2013.01); *B60W 2420/403* (2013.01)

(58) Field of Classification Search
  CPC ......... B60W 40/08; B60W 2040/0881; B60W 2420/42; G06V 20/593; G08B 21/24; G08B 25/004; G08B 29/183; G08B 21/22; B60R 1/00; B60R 2300/8006; B60N 2/002

See application file for complete search history.

(56) References Cited

U.S. PATENT DOCUMENTS

| 10,814,781 | B2  | 10/2020 | Lee |
| 2011/0102169 | A1  | 5/2011 | Orbach |
| 2012/0050021 | A1* | 3/2012 | Rao ........................ B60K 28/12 340/425.5 |
| 2018/0068544 | A1  | 3/2018 | Caperell |
| 2018/0141490 | A1* | 5/2018 | Sifuentes .............. B60W 40/08 |

FOREIGN PATENT DOCUMENTS

JP    2012-123491 A    6/2012

* cited by examiner

*Primary Examiner* — Rachid Bendidi
(74) *Attorney, Agent, or Firm* — Sughrue Mion, PLLC

(57) ABSTRACT

An information processing device associated with a vehicle includes a processor. The processor is configured to presume that a person or an item has been left behind in a rear seat of the vehicle, based on whether a rear door was opened and closed in a predetermined period before running of the vehicle and whether the rear door was opened and closed in a predetermined period after running of the vehicle. The processor is configured to perform sensing of the rear seat based on a presumption result. The processor is configured to notify the user based on a sensing result.

9 Claims, 10 Drawing Sheets

| DATE | TIME | VEHICLE STATE | DOOR OPENING AND CLOSING EVENT | DOOR NUMBER | |
|---|---|---|---|---|---|
| 2021/1/1 | 20:00:00 | PARKED STATE | NO | - | |
| 2021/1/1 | 20:00:30 | PARKED STATE | YES | 1 | |
| 2021/1/2 | 9:00:00 | STOPPED STATE | NO | - | |
| 2021/1/2 | 9:00:00 | STOPPED STATE | YES | 1 | 601 |
| 2021/1/2 | 9:05:00 | RUNNING STATE | NO | - | |
| 2021/1/2 | 9:30:00 | STOPPED STATE | NO | - | |
| 2021/1/2 | 9:30:30 | STOPPED STATE | YES | 1 | 602 |
| 2021/1/2 | 9:35:00 | PARKED STATE | NO | - | |

INFORMATION PROCESSING DEVICE, VEHICLE, INFORMATION PROCESSING METHOD, AND NON-TRANSITORY STORAGE MEDIUM

CROSS-REFERENCE TO RELATED APPLICATION

This application claims priority to Japanese Patent Application No. 2021-008756 filed on Jan. 22, 2021, incorporated herein by reference in its entirety.

BACKGROUND

1. Technical Field

The present disclosure relates to information processing devices, vehicles, information processing methods, and non-transitory storage media.

2. Description of Related Art

Many systems for preventing people and items from being left behind in a vehicle have been proposed in the art. For example, Japanese Unexamined Patent Application Publication No. 2012-123491 (JP 2012-123491 A) discloses a system that determines whether there is any item etc. left behind in a vehicle based on an image of the inside of the vehicle captured using a camera.

SUMMARY

The present disclosure provides an information processing device, a vehicle, an information processing method, and a non-transitory storage medium that accurately determine whether there is any person or item left behind in a vehicle.

A first aspect of the present disclosure is an information processing device associated with a vehicle. The information processing device includes a processor. The processor is configured to presume that a person or an item has been left behind in a rear seat of the vehicle, based on whether a rear door was opened and closed in a predetermined period before running of the vehicle and whether the rear door was opened and closed in a predetermined period after running of the vehicle. The processor is configured to perform sensing of the rear seat based on a presumption result. The processor is configured to notify a user based on a sensing result.

In the information processing device according to the first aspect of the present disclosure, the predetermined period before running of the vehicle may be a period from when the vehicle is unlocked until the vehicle starts to move. The predetermined period after running of the vehicle may be a period from when the vehicle is stopped until the vehicle is locked.

In the information processing device according to the first aspect of the present disclosure, the processor may be configured to presume that the person or the item has been left behind in the rear seat of the vehicle when the rear door was opened and closed in the predetermined period before running of the vehicle but the rear door was not opened and closed in the predetermined period after running of the vehicle.

In the information processing device according to the first aspect of the present disclosure, the processor may be configured to perform sensing of the rear seat using a seat sensor mounted in the vehicle.

In the information processing device according to the first aspect of the present disclosure, the processor may be configured to perform sensing of the rear seat using a camera that captures an image of inside of the vehicle.

In the information processing device according to the first aspect of the present disclosure, the processor may be configured to determine whether there is the person in the rear seat based on the sensing result.

In the information processing device according to the first aspect of the present disclosure, the processor may be configured to give a first notification using a terminal associated with the user. The processor may be configured to give a second notification using a device other than the terminal associated with the user when there is no response to the first notification from the user within a predetermined period.

In the information processing device according to the first aspect of the present disclosure, the processor may be configured to give the second notification when the processor determines that there is the person in the rear seat.

In the information processing device according to the first aspect of the present disclosure, the processor may be configured to further acquire information on a temperature inside a vehicle cabin of the vehicle. The processor may be configured to determine whether the temperature inside the vehicle cabin of the vehicle is higher than a predetermined value, based on the information on the temperature inside the vehicle cabin. The processor may be configured to give the second notification when the processor determines that there is the person in the rear seat and also determines that the temperature inside the vehicle cabin of the vehicle is higher than the predetermined value.

In the information processing device according to the first aspect of the present disclosure, the processor may be configured to give the second notification by operating an alarm of the vehicle.

In the information processing device according to the first aspect of the present disclosure, the processor may be configured to send data for giving the second notification to a center server that manages the vehicle.

In the information processing device according to the first aspect of the present disclosure, the processor may be configured to give a first notification when the processor determines that there is no person in the rear seat. The processor may be configured to give a second notification by a method different from the first notification when the processor determines that there is the person in the rear seat.

In the information processing device according to the first aspect of the present disclosure, the processor may be configured to acquire information on a temperature inside a vehicle cabin of the vehicle. The processor may be configured to give the second notification when the processor determines that there is the person in the rear seat and also determines that the temperature inside the vehicle cabin of the vehicle is higher than a predetermined value.

In the information processing device according to the first aspect of the present disclosure, the processor may be configured to give the second notification by operating an alarm of the vehicle.

In the information processing device according to the first aspect of the present disclosure, the processor may be configured to send data for giving the second notification to a center server that manages the vehicle.

A second aspect of the present disclosure is a vehicle including: a sensor that senses inside of a vehicle cabin of the vehicle; and a processor. The processor is configured to presume that a person or an item has been left behind in a rear seat of the vehicle, based on whether a rear door was opened and closed in a predetermined period before running of the vehicle and whether the rear door was opened and closed in a predetermined period after running of the vehicle. The processor is configured to perform sensing of the rear seat based on a presumption result. The processor is configured to notify a user based on a sensing result.

In the vehicle according to the second aspect of the present disclosure, the processor may be configured to presume that the person or the item has been left behind in the rear seat of the vehicle when the rear door was opened and closed in the predetermined period before running of the vehicle but the rear door was not opened and closed in the predetermined period after running of the vehicle.

In the vehicle according to the second aspect of the present disclosure, the processor may be configured to determine whether there is the person in the rear seat based on the sensing result.

A third aspect of the present disclosure is an information processing method including: presuming that a person or an item has been left behind in a rear seat of a vehicle, based on whether a rear door was opened and closed in a predetermined period before running of the vehicle and whether the rear door was opened and closed in a predetermined period after running of the vehicle; performing sensing of the rear seat based on a presumption result; and notifying a user based on a sensing result.

Instructions that cause a processor to perform the information processing method according to the third aspect of the present disclosure may be stored in a non-transitory storage medium.

The other aspect provides a program that causes a computer to perform the above information processing method or a computer-readable storage medium storing the program in a non-transitory manner.

According to the present disclosure, the presence of a person or an item left behind in the vehicle can be accurately determined.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
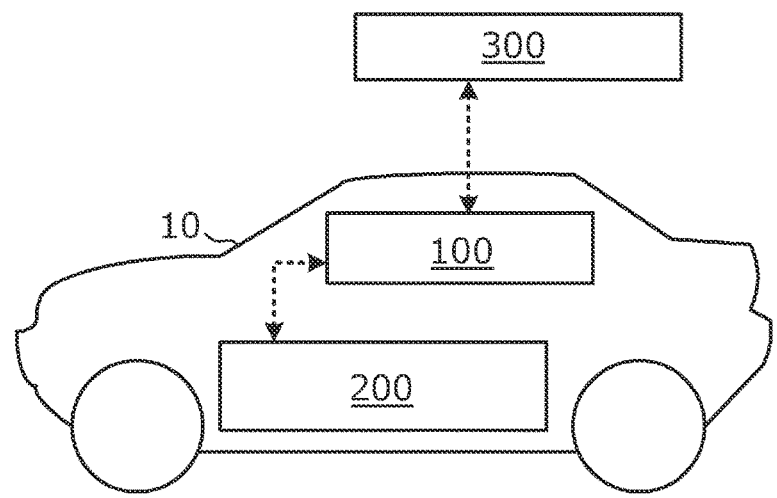
FIG. 1 is a system configuration diagram of a vehicle system according to an embodiment.

One aspect of the present disclosure is an information processing device that is mounted on a vehicle. Specifically, the information processing device includes a control unit configured to: presume that a person or an item has been left behind in a rear seat of the vehicle, based on whether a rear door was opened and closed in a predetermined period before running of the vehicle and whether the rear door was opened and closed in a predetermined period after running of the vehicle; perform sensing of the rear seat based on the presumption result; and notify a user based on the sensing result.

The rear door is a door to access the rear seat, that is, the seat located behind the driver's seat. For example, when the rear door was opened and closed before the vehicle started to move but the rear door was not opened after the vehicle finished moving, it can be determined that a person or an item may have been left behind in the rear seat. However, the determination result may be erroneous when such a determination is made based only on opening and closing of the rear door. For example, in a conventional system, it may be determined that a person or an item has been left behind and an alarm may be given when the rear seat was cleaned before running of the vehicle or when the item was unloaded before running of the vehicle. When trying to prevent a person or an item from being left behind in the vehicle by sensing the inside of the vehicle, it is difficult to distinguish whether a person or an item has been left behind in the vehicle or an item has just been left in the vehicle.

In order to deal with this problem, the information processing device according to the present disclosure presumes that a person or an item has been left behind in the rear seat of the vehicle based on opening and closing of the rear door, and determines whether sensing of the rear seat should be performed based on the presumption result. That is, when it is suspected that a person or an item has been left behind in the rear seat, sensing of the inside of the vehicle is performed. According to such a configuration, whether a person or an item has been left behind can be more accurately determined as compared to the case where the determination is made only by the record of opening and closing of the rear door or the result of sensing to the inside of the vehicle cabin.

The information processing device according to the present disclosure may be characterized in that the predetermined period before running of the vehicle is a period from when the vehicle is unlocked until the vehicle starts to move and the predetermined period after running of the vehicle is a period from when the vehicle is stopped until the vehicle is locked.

The information processing device according to the present disclosure may be characterized in that the control unit presumes that a person or an item has been left behind in the rear seat of the vehicle when the rear door was opened and closed in the predetermined period before running of the vehicle but the rear door was not opened and closed in the predetermined period after running of the vehicle. This is because, in this case, it is suspected that a person or an item has been left behind in the rear seat.

The information processing device according to the present disclosure may be characterized in that the control unit performs sensing of the rear seat using a seat sensor mounted in the vehicle. The seat sensor may be a sensor that detects the load applied to the seating surface such as the weight of an occupant, or may be a sensor that detects whether a seat belt has been fastened.

The information processing device according to the present disclosure may be characterized in that the control unit performs sensing of the rear seat using a camera that captures an image of inside of the vehicle. For example, whether there is a person or an item in the vehicle can be detected based on the image acquired from the camera.

The information processing device according to the present disclosure may be characterized in that the control unit determines whether there is a person in the rear seat based on the sensing result. This is because the degree of urgency may vary depending on whether the object detected in the rear seat is a person or an item.

The information processing device according to the present disclosure may be characterized in that the control unit gives a first notification using a terminal associated with the user and gives a second notification using other means when there is no response to the first notification within a predetermined period. The first notification and the second notification may be sent to different destinations or may be given by different means or methods. With such a configuration, it is possible to more reliably notify an outside that a person or an item has been left behind.

The information processing device according to the present disclosure may be characterized in that the control unit gives the second notification when the control unit determines that there is a person in the rear seat. The information processing device according to the present disclosure may be characterized in that the control unit acquires information on a temperature inside a vehicle cabin of the vehicle, and gives the second notification when there is a person in the rear seat and the temperature inside the vehicle cabin of the vehicle is higher than a predetermined value. That is, the second notification may be given when the degree of urgency is high.

The information processing device according to the present disclosure may be characterized in that the control unit gives the second notification by operating an alarm of the vehicle. The information processing device according to the present disclosure may be characterized in that the control unit sends data for giving the second notification to a center server that manages the vehicle. With such a configuration, it is possible to more reliably notify an outside that a person or an item has been left behind even when the driver of the vehicle does not notice it.

The information processing device according to the present disclosure may be characterized in that the control unit gives a first notification when the control unit determines that there is no person in the rear seat, and gives a second notification by a method different from the first notification when the control unit determines that there is a person in the rear seat. That is, when the detected object is a person, a notification may be given by a method or means different from usual or may be sent to a destination different from usual.

Hereinafter, embodiments of the present disclosure will be described with reference to the drawings. The configurations of the following embodiments are illustrative, and the present disclosure is not limited to the configurations of the embodiments.

First Embodiment

An overview of a vehicle system according to a first embodiment will be described with reference to FIG. 1. The vehicle system according to the present embodiment includes an in-vehicle device 100, a vehicle platform 200, and a user terminal 300. The in-vehicle device 100 is an example of the "information processing device." The in-vehicle device 100 and the vehicle platform 200 are mounted on the same vehicle 10.

The in-vehicle device 100 is a computer mounted on the vehicle 10. The in-vehicle device 100 has a function to determine that a person or an item has been left behind in the rear seat after the vehicle 10 is parked, based on information acquired from the vehicle platform 200 that will be described later. The in-vehicle device 100 also has a function to notify the user terminal 300 that will be described later based on the determination result.

The vehicle platform 200 is a platform including a plurality of computers that controls the vehicle 10. The user terminal 300 is a mobile terminal carried by an occupant of the vehicle 10.

Next, components of the system will be described in detail. The in-vehicle device 100 can be configured by a general-purpose computer. That is, the in-vehicle device 100 can be configured as a computer including a processor such as central processing unit (CPU) or graphics processing unit (GPU), a main storage device such as random access memory (RAM) or read-only memory (ROM), and an auxiliary storage device such as erasable programmable read-only memory (EPROM), hard disk drive, or removable medium.

The auxiliary storage unit stores an operating system (OS), various programs, various tables, etc. The processor executes the stored programs. It is thus possible to implement each function matching a predetermined purpose as will be described later. Part or all of the functions may be implemented by a hardware circuit such as application-specific integrated circuit (ASIC) or field-programmable gate array (FPGA).

Figure 2:
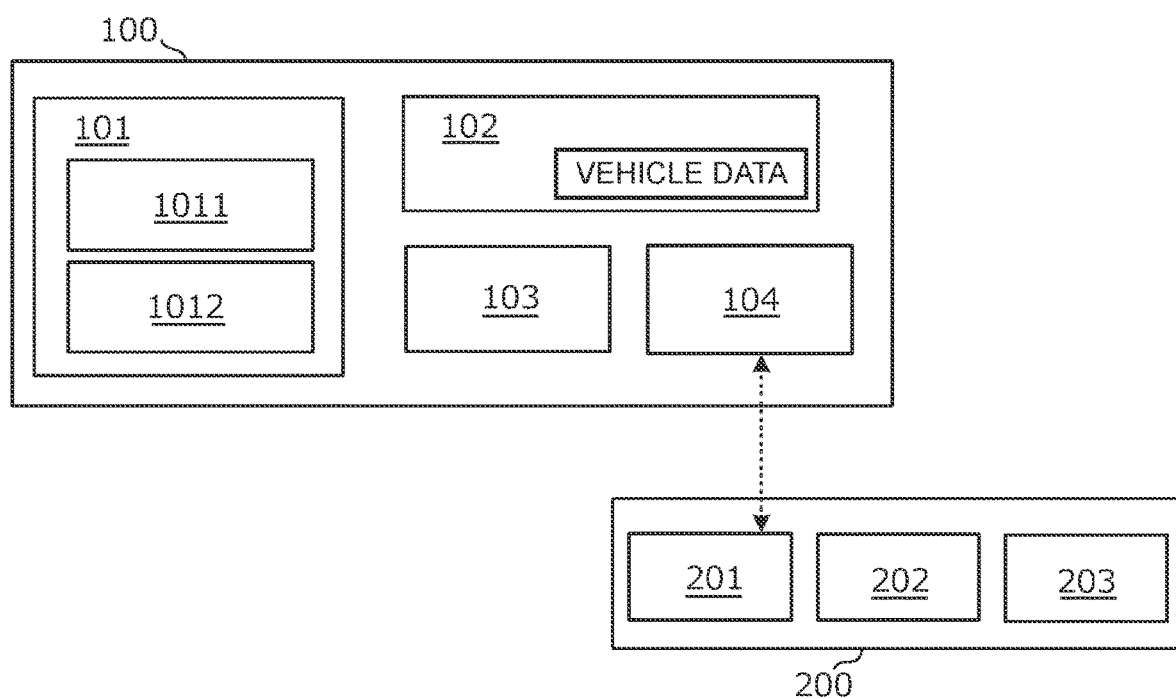
FIG. 2 is a block diagram showing components of an in-vehicle device and components of a vehicle platform.

FIG. 2 is a block diagram schematically showing an example of the configurations of the in-vehicle device 100 and the vehicle platform 200 shown in FIG. 1. The in-vehicle device 100 includes a control unit 101, a storage unit 102, a communication unit 103, and a vehicle communication unit 104.

The control unit 101 controls the in-vehicle device 100. The control unit 101 is composed of, for example, an information processing unit such as CPU or GPU. The control unit 101 has a state determination unit 1011 and an alarm unit 1012 as functional modules. Each functional module may be implemented by the CPU executing a program stored in storage means such as ROM.

Figures 3, 4:
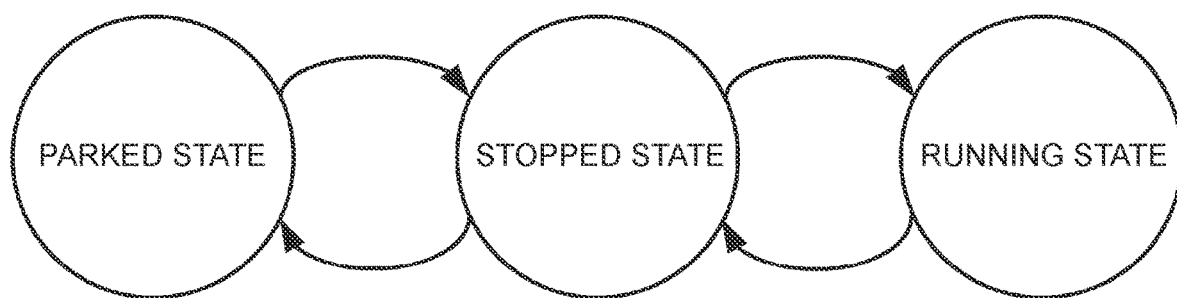
FIG. 3 illustrates state transition of a vehicle.
FIG. 4 illustrates vehicle data stored in a storage unit.

The state determination unit 1011 makes a determination regarding the state of the vehicle 10. FIG. 3 is a state transition diagram of the vehicle 10 according to the present embodiment. As shown in FIG. 3, the vehicle 10 according to the present embodiment can be in one of three predefined states. An example of the three predefined states is a "parked state," a "stopped state," and a "running state." The vehicle 10 can be in the "parked state" when the vehicle 10 is parked and occupants are away from the vehicle 10. Specifically, the vehicle 10 can be in the "parking state" when the engine or system power of the vehicle 10 is off and the doors of the vehicle 10 are locked. The vehicle 10 can be in the "stopped state" when the vehicle 10 is stopped (speed is 0 km/h) with the engine running (or with the system power on) or with the doors not locked. The vehicle 10 can be in the "running state" when the vehicle 10 is running (moving). That is, the vehicle 10 can be in the "running state" when the speed of the vehicle 10 is not 0 km/h.

The state determination unit 1011 monitors the state of the vehicle 10 based on information (e.g., the operating state of the engine, the lock state of the doors, the vehicle speed, etc.) acquired from the vehicle platform 200 that will be described later. When the state of the vehicle 10 has changed, the state determination unit 1011 records the state change of the vehicle 10 as vehicle data in the storage unit 102 that will be described later. The state determination unit 1011 monitors for door of the vehicle 10 opening and closing events. When any of the doors is opened and closed, the state determination unit 1011 records the door opening and closing event as the vehicle data. Whether a door opening and closing event has occurred can be determined based on the information acquired from the vehicle platform 200 that will be described later. The recorded vehicle data is used by the alarm unit 1012 that will be described later.

The alarm unit 1012 presumes that a person (e.g., an infant) or an item in the rear seat has been left behind, based on the vehicle data recorded by the state determination unit 1011. For example, when there is a record that the rear door was opened and closed after transition from the parked state to the stopped state but there is no record that the rear door was opened and closed before transition from the stopped state to the parked state, the alarm unit 1012 can presume that a person or an item has been left behind.

When the alarm unit 1012 presumes that a person or an item has been left behind, the alarm unit 1012 senses the inside of a vehicle cabin of the vehicle 10 to check whether there is a person or an item in the vehicle cabin. The sensing can be performed using a sensor (that will be described later) provided in the vehicle 10. For example, a seat sensor is mounted in the rear seat of the vehicle 10. In this case, whether there is a person or an item in the rear seat of the vehicle 10 can be detected based on data output from the seat sensor. The vehicle 10 is equipped with, for example, a camera that captures an image of the inside of the vehicle 10. In this case, whether there is a person or an item in the rear seat of the vehicle 10 can be detected based on image data. The alarm unit 1012 sends data notifying that a person or an item has been left behind (hereinafter referred to as notification data) to the user terminal 300 according to the sensing result. The notification data may include information obtained as a result of the sensing (e.g., an image of the inside of the vehicle 10).

The storage unit 102 is means for storing information and is composed of a storage medium such as RAM, magnetic disk, or flash memory. The storage unit 102 stores various programs to be executed by the control unit 101, data to be used by the programs, etc. The storage unit 102 also stores data recording the state of the vehicle 10 and the rear door opening and closing events (vehicle data described above).

The vehicle data stored in the storage unit 102 will be described. FIG. 4 is an example of the vehicle data stored in the storage unit 102. In the present embodiment, the state determination unit 1011 generates a new record when the state of the vehicle 10 has transitioned and when a door opening and closing event has occurred. The new record generated is added to the vehicle data. As shown in the figure, the vehicle data includes fields indicating the date, time, state of the vehicle 10, whether a door opening and closing event has occurred, and door number.

The "date" and "time" fields store data indicating the date and time the record was generated. The "vehicle state" field stores the status of the vehicle 10 at the time the record was generated. For example, when the state of the vehicle 10 has transitioned from the "parked state" to the "stopped state," a record that the "vehicle state" is the "stopped state" is generated.

The "door opening and closing event" field stores data indicating whether a door opening and closing event has occurred. The "door number" field stores the numbers uniquely assigned to the individual doors of the vehicle 10 (see FIG. 5).

By referring to these records, the alarm unit 1012 can determine whether a door opening and closing event occurred in the period from when the doors of the vehicle 10 were unlocked until the vehicle 10 started to move, and whether a door opening and closing event occurred in the period from when the vehicle 10 was stopped until the doors of the vehicle 10 were locked.

For example, a plurality of records indicated by sign 601 in FIG. 4 means that the vehicle 10 transitioned from the parked state to the stopped state, the door 1 was then opened and closed, and thereafter the vehicle 10 transitioned to the running state. A plurality of records indicated by sign 602 in FIG. 4 means that the vehicle 10 transitioned from the running state to the stopped state, the door 1 was then opened and closed, and thereafter the vehicle 10 transitioned to the parked state.

The communication unit 103 is an interface that wirelessly communicates with the user terminal 300. The communication unit 103 can communicate with the user terminal 300 by using, for example, a mobile communication network, a wireless local area network (LAN), Bluetooth (registered trademark), etc.

The vehicle communication unit 104 is an interface unit that communicates with the vehicle platform 200. The vehicle communication unit 104 is configured to communicate with a plurality of electronic control units (ECUs) and a sensor included in the vehicle platform 200 via an in-vehicle network.

The vehicle platform 200 is a platform including a plurality of computers that controls the vehicle 10. The vehicle platform 200 includes one or more computers that control the vehicle 10, such as an engine ECU 201 and a body ECU 202. The engine ECU 201 is a computer that performs fuel injection control, ignition control, intake and exhaust control, etc. The engine ECU 201 may also perform control for a power train. In the present embodiment, the engine ECU 201 can acquire information on the operating state of the vehicle 10 (the operating state of the engine and the system power) and the speed of the vehicle 10.

Figure 5:
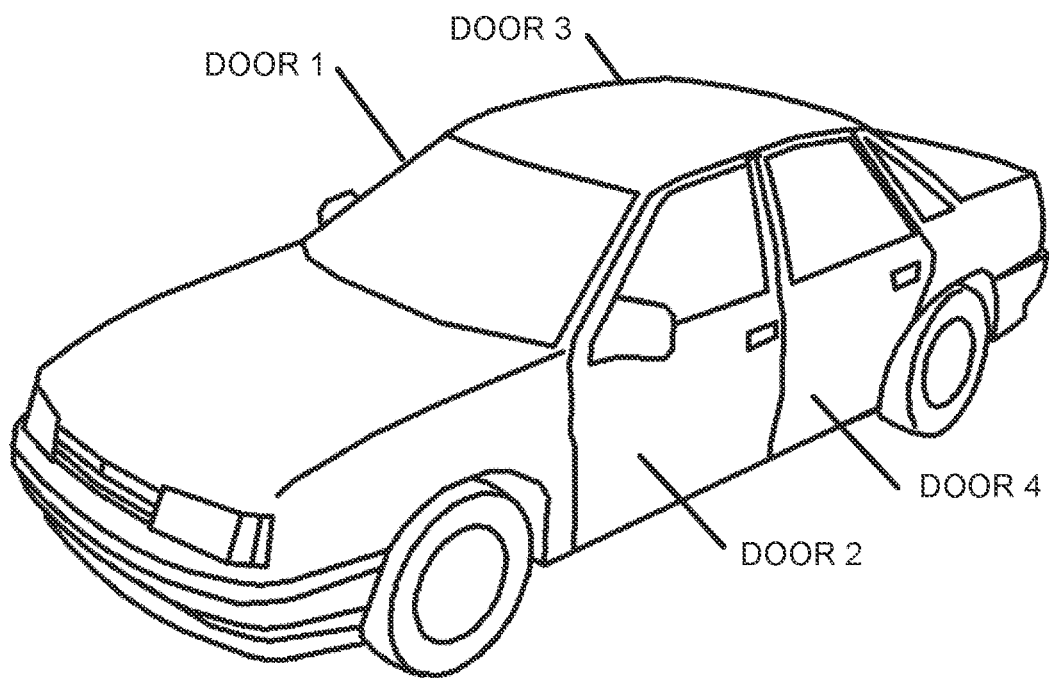
FIG. 5 illustrates the positions of doors of the vehicle.

The body ECU 202 is a computer that controls locking and unlocking of the doors and other electrical components etc. of the vehicle 10. In the present embodiment, the body ECU 202 can acquire information on opening and closing of the doors of the vehicle 10 and the lock state of the doors of the vehicle 10. FIG. 5 shows an example of the doors of the vehicle 10. The vehicle 10 described in the present embodiment has four doors 1 to 4. The door 3 and the door 4 are the doors (rear doors) to access the rear seat. The body ECU 202 can acquire information on opening and closing of the doors and the lock state of the doors.

The vehicle platform 200 further includes a sensor 203. The sensor 203 includes one or more sensors that sense the inside of the vehicle cabin. An example of the sensor that senses the inside of the vehicle cabin is a seat sensor. The seat sensor is mounted in each of a plurality of seats of the vehicle 10 and can output sensor data indicating the load being applied to the seating surface of the seat. Another example of the sensor that senses the inside of the vehicle cabin is an image sensor. The image sensor is configured to capture an image of the inside of the vehicle cabin.

Figure 6:
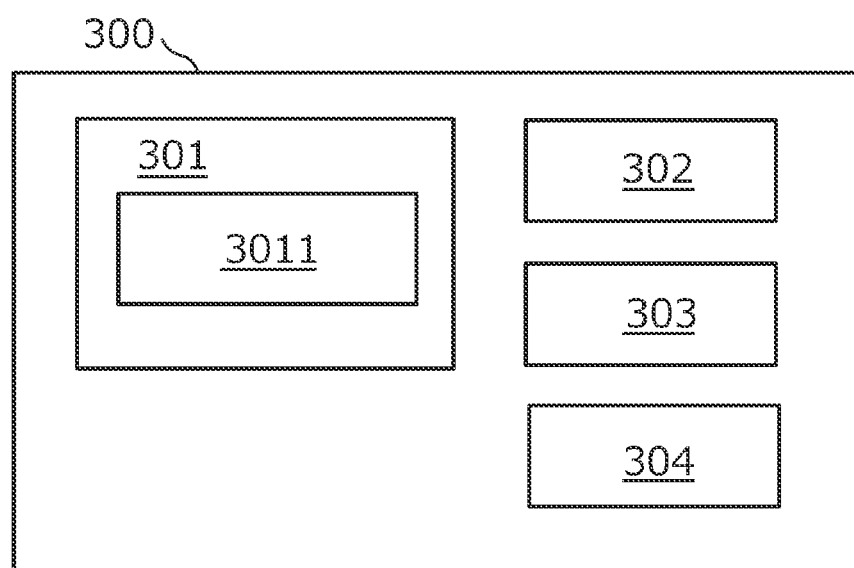
FIG. 6 is a block diagram showing components of a user terminal.

Next, the user terminal 300 will be described with reference to FIG. 6. The user terminal 300 is a mobile computer carried by an occupant of the vehicle 10. The user terminal 300 includes a control unit 301, a storage unit 302, a communication unit 303, and an input and output unit 304.

The control unit 301 is means for controlling the user terminal 300. The control unit 301 is composed of, for example, an information processing unit (processor) such as CPU. The control unit 301 may implement these functions by executing programs stored in the storage unit 302 that will be described later by the CPU.

The control unit 301 includes a notification unit 3011 as a functional module. This functional module may be implemented by the CPU executing a program stored in storage means (such as ROM).

The notification unit 3011 generates a notification that a person or an item has been left behind in the rear seat, based on the notification data received from the in-vehicle device 100. The notification is output via the input and output unit 304. For example, the notification can be given by voice or image.

The storage unit 302 is means for storing information and is composed of a storage medium such as RAM, magnetic disk, or flash memory. The storage unit 302 stores various programs to be executed by the control unit 301, data to be used by the programs, etc.

The communication unit 303 is communication means for wirelessly communicating with the in-vehicle device 100. The communication unit 303 wirelessly communicates with the in-vehicle device 100 by means similar to that of the communication unit 103.

The input and output unit 304 is means for receiving an input operation performed by a user and presenting information to the user. Specifically, the input and output unit 304 is composed of a touch panel, control means for the touch panel, a liquid crystal display, and control means for the liquid crystal display. In the present embodiment, the touch panel and the liquid crystal display are provided as a single touch panel display. The input and output unit 304 may have a speaker etc. that outputs audio.

Figure 7:
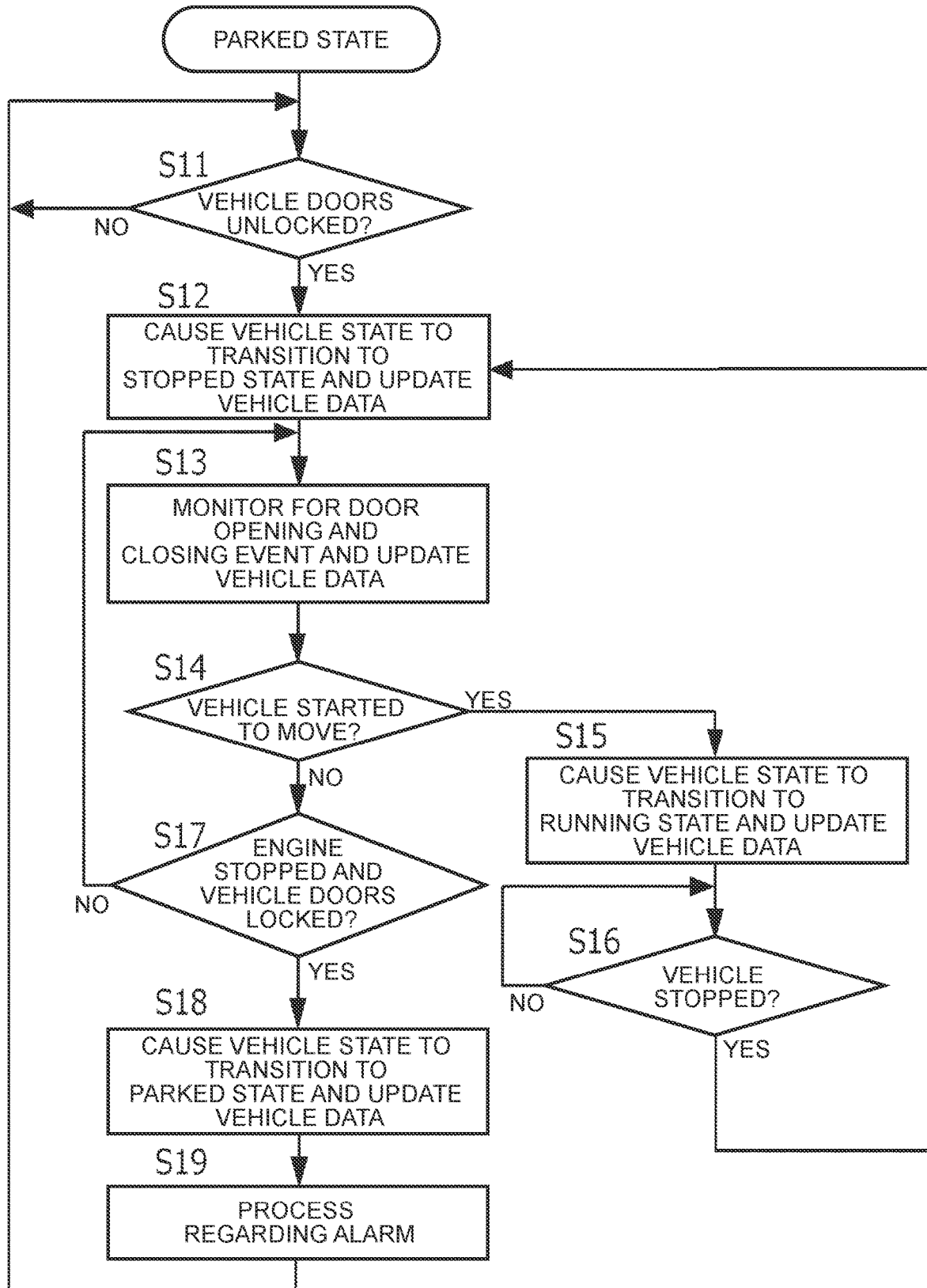
FIG. 7 is a flowchart of a process that is performed by an in-vehicle device.

Next, processes that are performed by the components of the system will be described in detail. FIG. 7 is a flowchart of a process that is performed by the in-vehicle device 100. The illustrated process is performed by the control unit 101.

First, in step S11, the state determination unit 1011 determines whether the doors of the vehicle 10 have been unlocked. Whether the doors of the vehicle 10 have been unlocked can be determined based on information acquired from the body ECU 202. When YES in step S11, the process proceeds to step S12. When NO in step S11, the process returns to the initial state. In step S12, the state of the vehicle 10 is caused to transition to the "stopped state," and a new record is added to the vehicle data.

In step S13, the state determination unit 1011 monitors for a door opening and closing event based on the information acquired from the body ECU 202. When any of the doors is opened and closed in the stopped state, a new record indicating the door opening and closing event is added to the vehicle data.

In step S14, the state determination unit 1011 determines whether the vehicle 10 has started to move. Whether the vehicle 10 has started to move can be determined based on information acquired from the engine ECU 201. When YES in step S14, the process proceeds to step S15. In step S15, the state of the vehicle 10 is caused to transition to the "running state," and a new record is added to the vehicle data.

When the state of the vehicle 10 is the "running state," the state determination unit 1011 monitors the speed of the vehicle 10 based on the information acquired from the engine ECU 201. When it is determined that the vehicle 10 has stopped based on the speed of the vehicle 10 (step S16, YES), the process returns to step S12. That is, the state of the vehicle 10 is caused to transition to the "stopped state," and a new record is added to the vehicle data. When the vehicle 10 is running (step S16, NO), the state determination unit 1011 continues to monitor the speed of the vehicle 10.

When NO in step S14, the process proceeds to step S17. In step S17, the state determination unit 1011 determines whether the engine of the vehicle 10 has been stopped and the doors of the vehicle 10 have been locked. Whether the engine of the vehicle 10 has been stopped can be determined based on the information acquired from the engine ECU 201. Whether the doors of the vehicle 10 have been locked can be determined based on the information acquired from the body ECU 202. When NO in step S17, the process returns to step S13.

When YES in step S17, the process proceeds to step S18. In step S18, the state of the vehicle 10 is caused to transition to the "parked state," and a new record is added to the vehicle data.

In step S19, a process regarding alarm is performed based on the latest vehicle data. It is determined whether a person or an item has been left behind in the vehicle 10. When it is determined that a person or an item has been left behind in the vehicle 10, notification data is sent to the user terminal 300.

Figure 8:
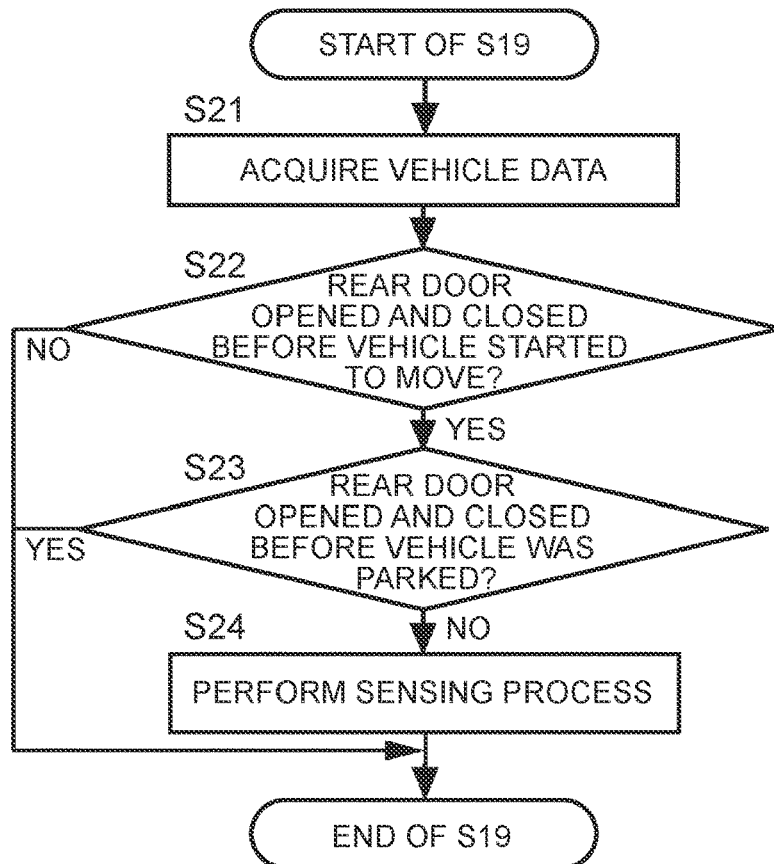
FIG. 8 is a flowchart of a process of step S19.

The process that is performed in step S19 will be described in more detail with reference to FIG. 8. FIG. 8 is a flowchart illustrating in detail the process that is performed in step S19. First, in step S21, the alarm unit 1012 acquires the vehicle data stored in the storage unit 102. Next, in step S22, the alarm unit 1012 determines whether the rear door was opened and closed before the vehicle 10 started to move, based on the vehicle data. This determination is made by the following procedure.

(1) Extract two latest records indicating that the state of the vehicle 10 has transitioned from the parked state to the stopped state and then to the running state.

(2) Determine whether there is a record of an opening and closing event of the rear door between the times corresponding to these records.

When YES in step S22, the process proceeds to step S23. When NO in step S22, the process of step S19 ends.

In step S23, the alarm unit 1012 determines whether the rear door was opened and closed before the vehicle 10 was parked, based on the vehicle data. Specifically, when the vehicle data includes a record satisfying the following conditions, it is determined that the rear door was opened and closed after the vehicle 10 was parked. This determination is made by the following procedure.

(1) Extract two latest records indicating that the state of the vehicle 10 has transitioned from the running state to the stopped state and then to the parked state.

(2) Determine whether there is a record of an opening and closing event of the rear door between the times corresponding to these records.

When NO in step S23, the process proceeds to step S24. When YES in step S23, the process of step S19 ends.

In step S24, the alarm unit 1012 senses the inside of the vehicle cabin. When the process proceeds to step S24, it can be said that it is suspected that a person or an item has been left behind in the rear seat. In this case, the alarm unit 1012 senses the inside of the vehicle cabin to detect a person or an item in the rear seat.

Figure 9:
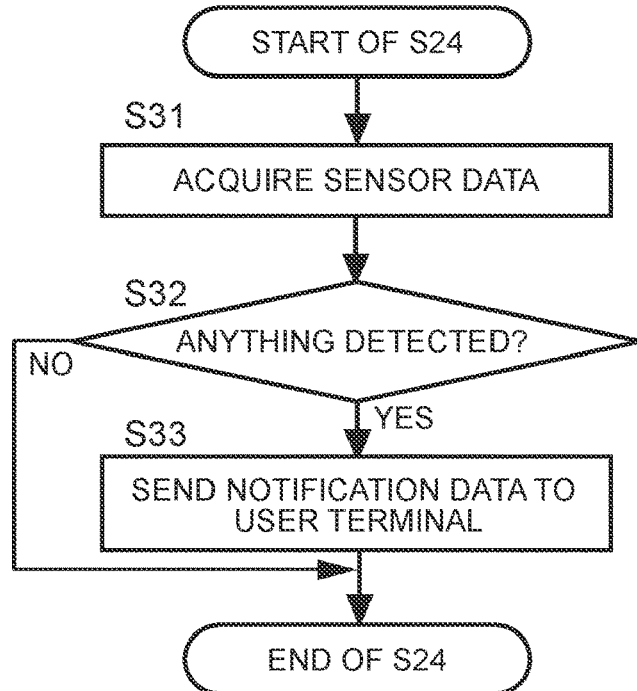
FIG. 9 is a flowchart of a process of step S24 in a first embodiment.

The process that is performed in step S24 will be described in more detail with reference to FIG. 9. FIG. 9 is a flowchart illustrating in detail the process that is performed in step S24. First, in step S31, the alarm unit 1012 acquires sensor data from the sensor 203 in the vehicle 10. For example, a seat sensor is mounted in the rear seat of the vehicle 10. In this case, whether there is a person or an item in the rear seat of the vehicle 10 can be determined based on data output from the seat sensor. The vehicle 10 is equipped with a camera that captures an image of the inside of the vehicle 10 as an image sensor. In this case, whether there is a person or an item in the rear seat of the vehicle 10 can be determined based on image data captured by the camera.

In step S32, the alarm unit 1012 determines whether there is a person or an item in the rear seat. When YES in step S32, the process proceeds to step S33. In step S33, the alarm unit 1012 sends notification data to the user terminal 300. When the notification data is received by the user terminal 300, the notification unit 3011 generates a notification and outputs the notification via the input and output unit 304. For example, the notification can be given by vibration of a vibrator, audio output, image output, etc. When NO in step S32, the process of step S24 ends.

As described above, the in-vehicle device 100 according to the first embodiment presumes that a person or an item has been left behind in the rear seat, based on whether the rear door was opened and closed before the vehicle 10 started to move and whether the rear door was opened and closed after the vehicle 10 finished moving. When it is suspected that a person or an item has been left behind, sensing of the inside of the vehicle 10 is performed using the sensor. Accuracy of detection of whether a person or an item has been left behind can be improved by using both the determination based on opening and closing of the rear door and the determination using the sensor.

Second Embodiment

In the first embodiment, the in-vehicle device 100 sends notification data to the user terminal 300, and the user terminal 300 having received the notification data generates a notification for the user. In a second embodiment, when the user does not respond to the notification, the in-vehicle device 100 gives another notification by means other than the user terminal 300.

Figure 10:
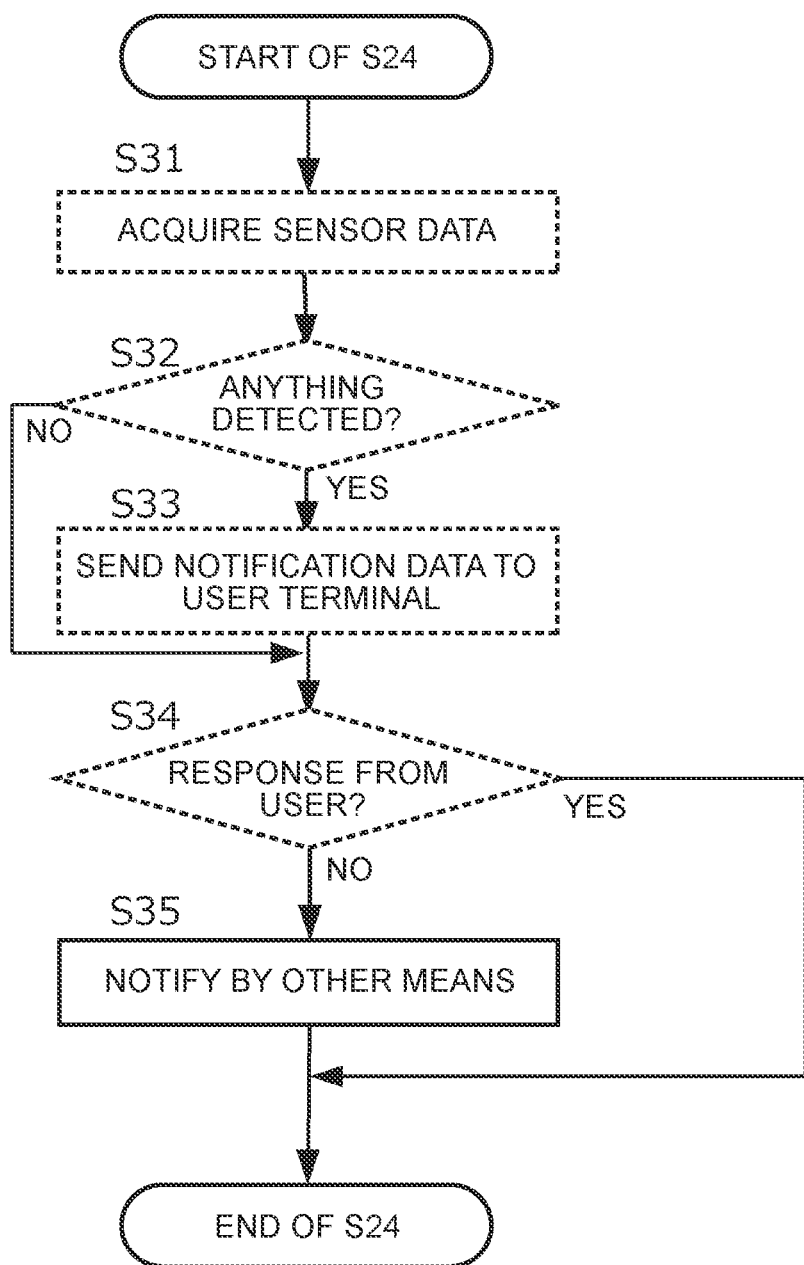
FIG. 10 is a flowchart of the process of step S24 in a second embodiment.

FIG. 10 is a flowchart of the process of step S24 in the second embodiment. Since steps S31, S32, and S33 shown by dashed lines are similar to those of the first embodiment, description thereof will be omitted. In the second embodiment, the alarm unit 1012 checks whether there is a response from the user after sending the notification data to the user terminal 300. The user terminal 300 having received the notification acquires the response indicating an acknowledgement of the notification from the user. When the user terminal 300 obtains the response from the user, the user terminal 300 sends data that there is the response to the in-vehicle device 100. When there is no response from the user (including the case of a time-out), the user terminal 300 sends data that there is no response to the in-vehicle device 100.

In step S34, the alarm unit 1012 determines whether there is a response from the user. When there is no response, the process proceeds to step S35, and the in-vehicle device 100 gives another notification by other means (that is, by means other than the user terminal 300). This notification is referred to as a second notification. When there is a response from the user, the process of step S24 ends. For example, other means may be a center server that manages the system. In this case, the in-vehicle device 100 may generate notification data indicating that the subject user does not respond, and may send the notification data to the center server. As a result, for example, an administrator of the center server can contact the user, unlock the doors of the vehicle 10, open the windows of the vehicle 10, etc. Equipment mounted in the vehicle 10 may be used as other means. For example, the in-vehicle device 100 can operate an alarm or light (e.g., hazard lights etc.) mounted on the vehicle 10 via the vehicle platform 200. As a result, it is possible to notify people around the vehicle 10 that a person or an item has been left behind.

As described above, according to the second embodiment, when there is no response from the user, another notification is given by other means. This configuration makes it possible to notify a third party that a person or an item has been left behind more reliably.

Third Embodiment

In the second embodiment, when there is no response to the notification from the user, another notification (second notification) is given by other means. When the degree of urgency is low, it may be suitable to restrain the second notification from being given. In view of this, in a third embodiment, the second notification is restrained from being given when there is no person left behind in the vehicle 10.

Figure 11:
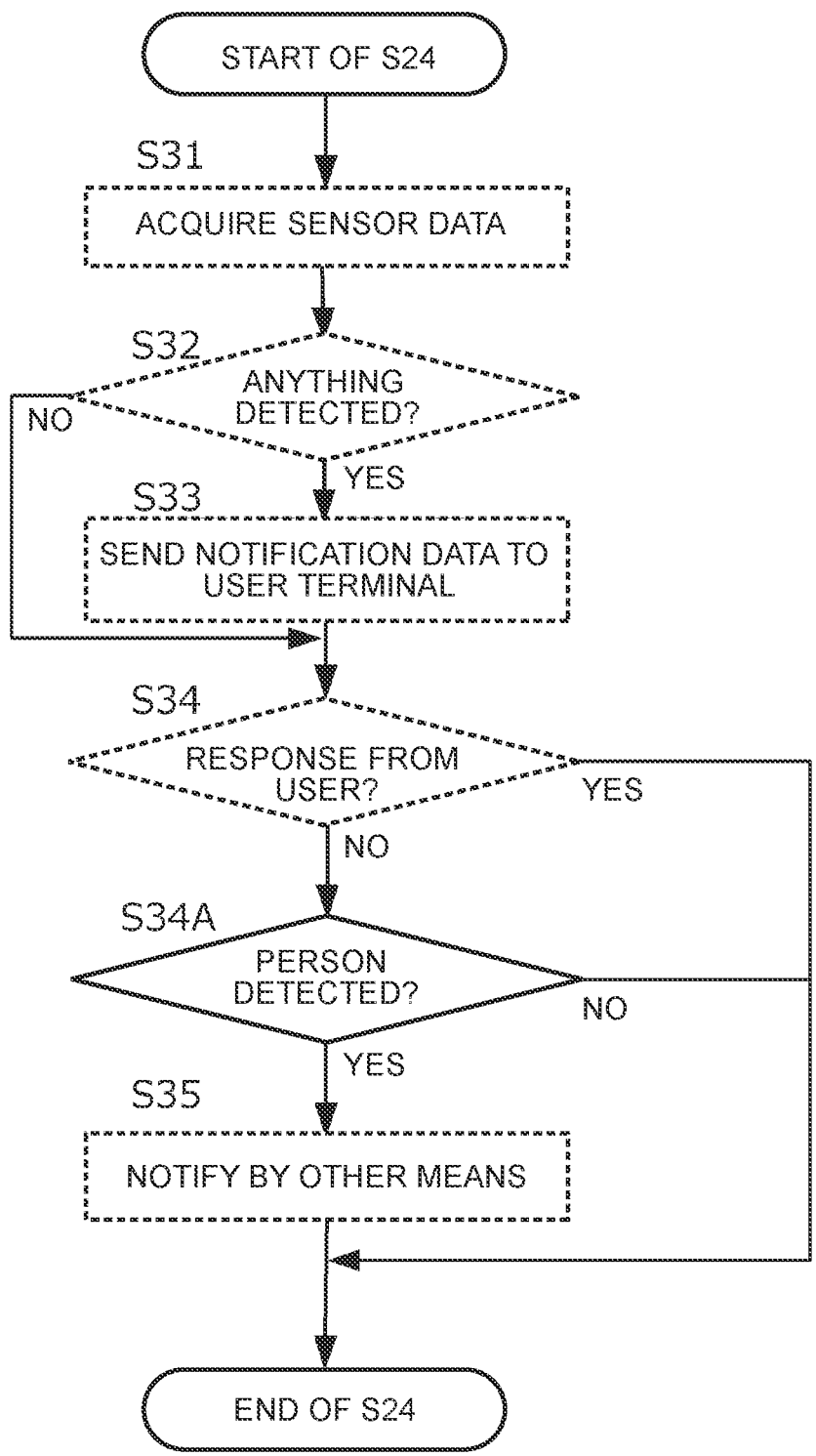
FIG. 11 is a flowchart of the process of step S24 in a third embodiment.

FIG. 11 is a flowchart of the process of step S24 in the third embodiment. Since steps S31, S32, S33, S34, and S35 shown by dashed lines are similar to those of the second embodiment, description thereof will be omitted. In the third embodiment, when it is determined that there is no response to the notification from the user, it is determined in step S34A whether a person has been detected in the vehicle 10. For example, when sensing is performed using a weight sensor mounted in the seat of the vehicle 10, whether there is a person in the vehicle 10 can be determined by determining whether the weight is greater than a threshold (e.g., 5 kg). When a sensor that acquires data on whether a seat belt has been fastened is used, it can be determined that there is a person in the vehicle 10 when the seat belt of the rear seat has been fastened. When sensing is performed using a camera that captures an image of the inside of the vehicle cabin of the vehicle 10, whether there is a person in the vehicle 10 can be determined based on the image analysis result. For example, when a face is detected from the captured image, it can be determined that there is a person in the vehicle 10. It may be determined that there is a person in the vehicle 10 when motion is detected based on continuously acquired images.

In the third embodiment, the process of step S35 is performed only when a person is detected in the vehicle 10. This configuration restrains an alarm (second notification) from being given due to an item left behind in the vehicle 10.

Fourth Embodiment

In the third embodiment, the second notification is given on condition that a person remains in the vehicle 10. However, it is also possible that the driver has left the vehicle 10 and a passenger is waiting in the vehicle 10. In view of this, in a fourth embodiment, whether the second notification should be given is determined based further on the temperature inside the vehicle 10.

Figure 12:
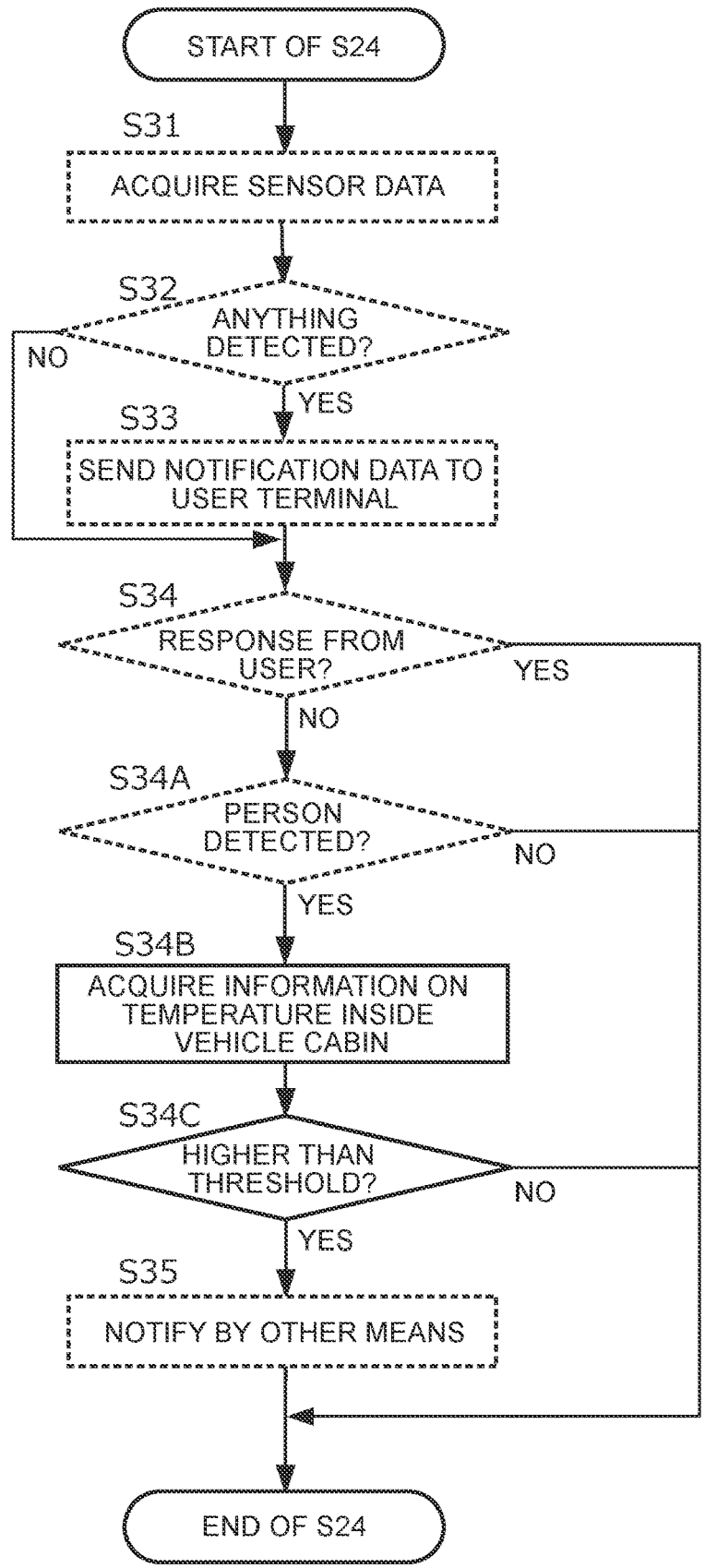
FIG. 12 is a flowchart of the process of step S24 in a fourth embodiment.

FIG. 12 is a flowchart of the process of step S24 in the fourth embodiment. Since steps S31, S32, S33, S34, S34A, and S35 shown by dashed lines are similar to those of the third embodiment, description thereof will be omitted. In the fourth embodiment, when it is determined that there is no response to the notification from the user, information on the temperature inside the vehicle cabin of the vehicle 10 (temperature information) is acquired after step S34A (step S34B). For example, the temperature information can be acquired via the body ECU 202. When the sensor 203 includes a temperature sensor, the temperature information may be acquired directly from the sensor 203. In step S34C, it is determined whether the temperature inside the vehicle cabin is higher than a threshold, based on the acquired temperature information. When the temperature inside the vehicle cabin is higher than the threshold (e.g., 35 degrees Celsius), the process proceeds to step S35.

As described above, in the fourth embodiment, the process of step S35 is performed only when there is a person in the vehicle 10 and the temperature inside the vehicle cabin is high. This makes it possible to given an alarm only when the inside of the vehicle 10 is in a dangerous condition.

Fifth embodiment

In the second to fourth embodiments, a notification is first sent to the user terminal 300, and when there is no response, a second notification is given by other means. A fifth embodiment is an embodiment in which different notification methods are used depending on whether the object detected in the vehicle 10 is a person or an item.

Figure 13:
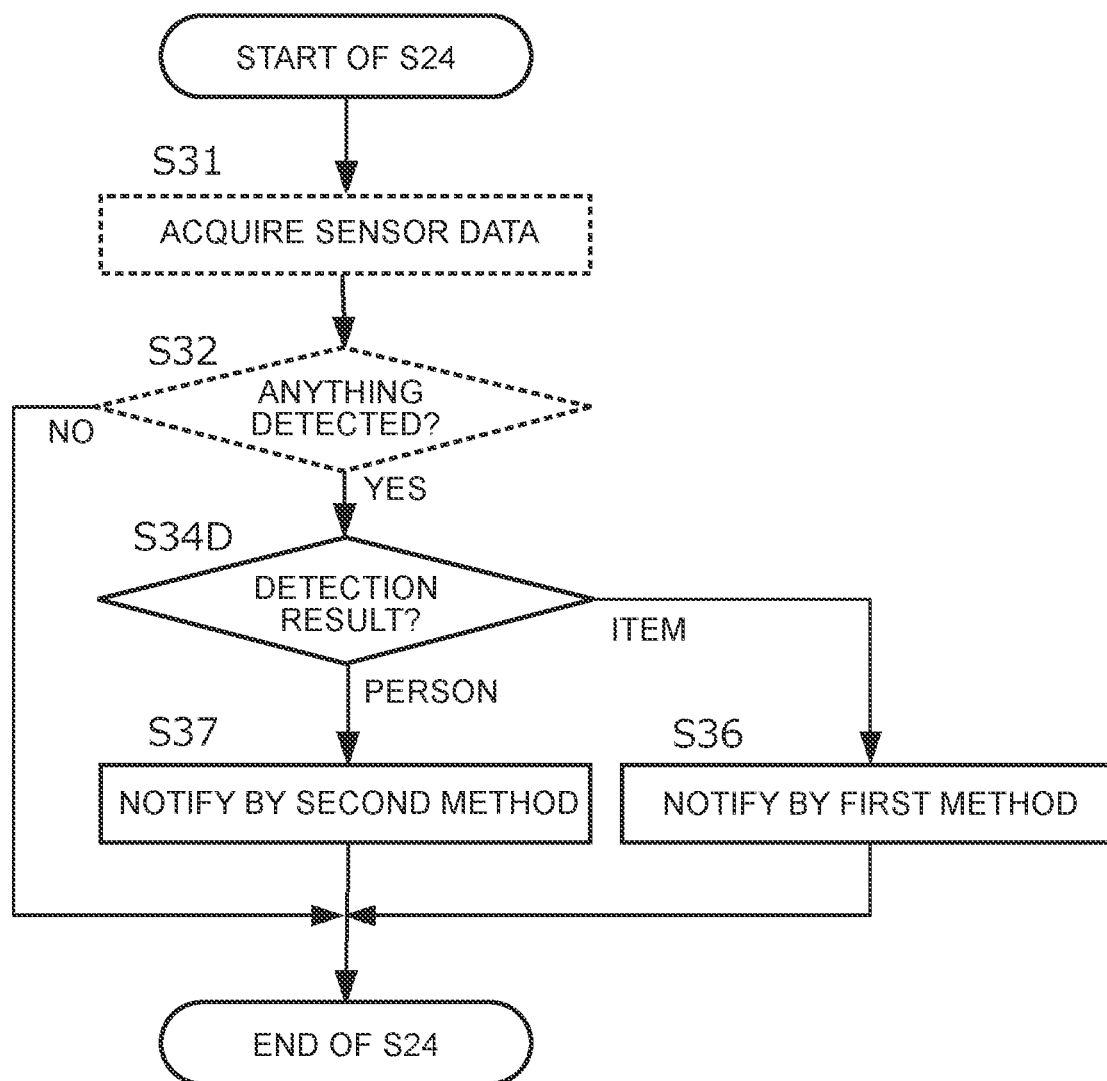
FIG. 13 is a flowchart of the process of step S24 in a fifth embodiment.

FIG. 13 is a flowchart of the process of step S24 in the fifth embodiment. Since steps S31 and S32 shown by dashed lines are similar to those of the first embodiment, description thereof will be omitted. In the fifth embodiment, when it is determined in step S32 that there is a person or an item in the rear seat, it is further determined whether the detected object is a person or an item (step S34D). As described in the third embodiment (step S34), this determination can be made based on the sensor data acquired by the seat sensor, the image acquired by the camera, etc.

When it is determined in step S34D that an item has been left behind in the rear seat, the process proceeds to step S36, and a notification is given by a first method. When it is determined in step S34D that a person has been left behind in the rear seat, the process proceeds to step S37, and a notification is given by a second method.

The first method and the second method may use different means for giving a notification. For example, when the first method is a method in which a notification is output via the user terminal 300, the second method may be a method in which a notification is output via the alarm of the vehicle 10. For example, when the first method is a method in which the vibrator of the user terminal 300 is vibrated, the second method may be a method in which audio is output from the user terminal 300.

The notification data may be sent to different destinations between the first method and the second method. For example, when the first method is a method in which notification data is sent to the user terminal 300, the second method may be a method in which notification data is sent to the center server.

Figure 14:
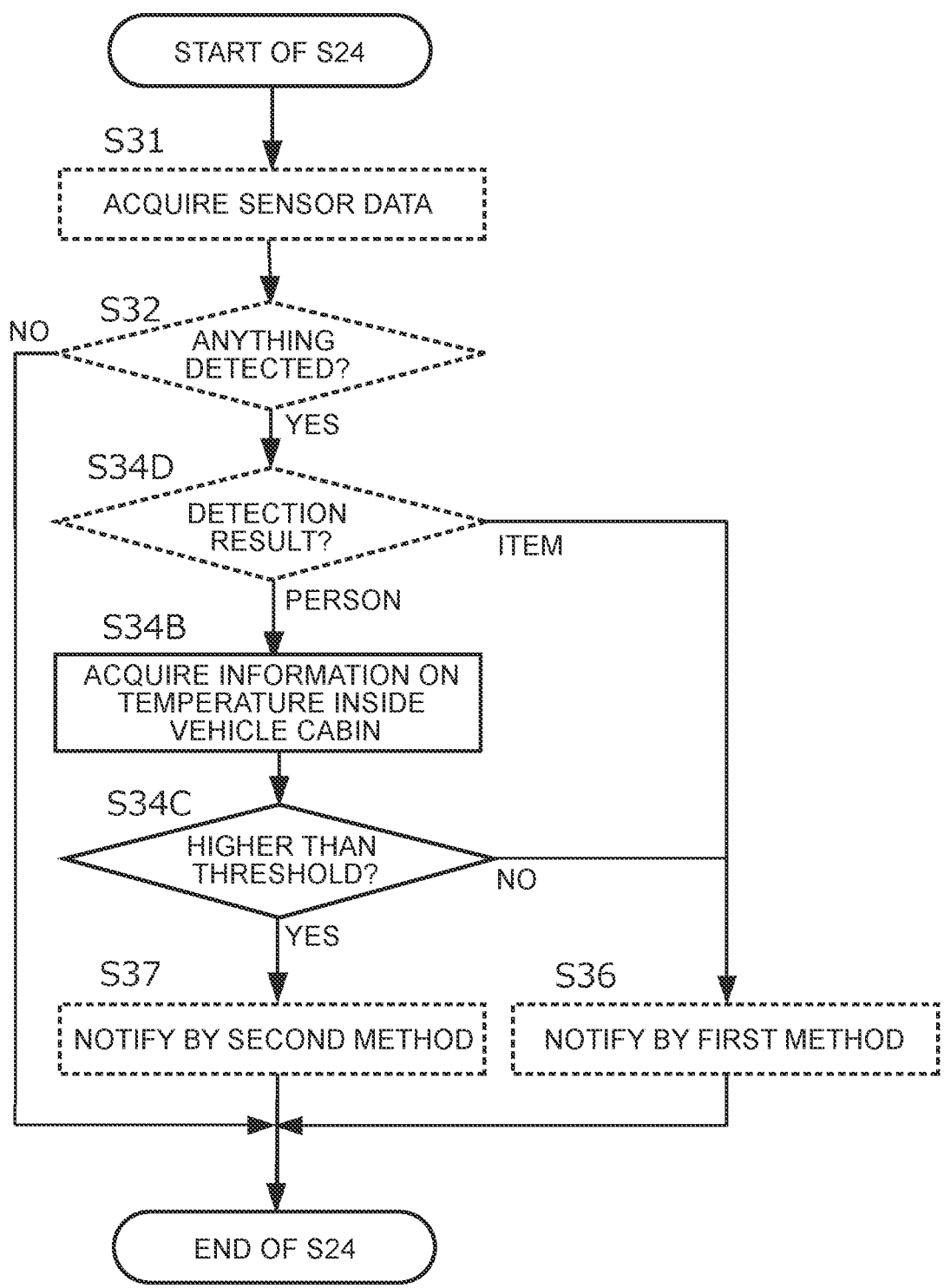
FIG. 14 is a flowchart of the process of step S24 in a fifth embodiment (modification).

In the fifth embodiment, a notification is given by the second method when a person has been left behind in the rear seat. In the fourth embodiment, whether a notification is given by the first method or the second method may be selected based further on the temperature inside the vehicle cabin. For example, as shown in FIG. 14, the step of determining the temperature inside the vehicle cabin (steps S34B and S34C) may be added after step S34D, and a notification may be given by the second method only when the temperature inside the vehicle cabin is high.

Modifications

The above embodiments are merely illustrative, and the present disclosure may be modified as appropriate without departing from the spirit and scope of the present disclosure. For example, the processes and means described in the present disclosure can be combined as desired as long as no technical contradiction occurs.

In the description of the embodiments, the in-vehicle device mounted on the vehicle is illustrated as an information processing device. However, the illustrated functions may be performed by a device provided outside the vehicle (hereinafter referred to as the external device, typically a server device etc.). In this case, the vehicle platform 200 may send various kinds of data (opening and closing of the doors, speed, operating state, etc.) to the external device, and the external device may perform the functions illustrated in the present specification based on the received data.

The processes described as being performed by one device may be allocated to and performed by a plurality of devices. Alternatively, the processes described as being performed by different devices may be performed by one device. The type of hardware configuration (server configuration) that is used to implement each function in the computer system can be flexibly changed.

The present disclosure can also be implemented by supplying computer programs implementing the functions described in the above embodiments to a computer, and causing one or more processors of the computer to read and execute the programs. Such computer programs may be provided to the computer by a non-transitory computer-readable storage medium that can be connected to a system bus of the computer, or may be provided to the computer via a network. Examples of the non-transitory computer-readable storage medium include: any type of disk such as magnetic disk (floppy (registered trademark) disk, hard disk drive (HDD), etc.) and optical disk (compact disc (CD)-ROM, digital versatile disc (DVD), Blu-ray disc, etc.); a read only memory (ROM); a random access memory (RAM); an erasable programmable ROM (EPROM); an electrically erasable programmable ROM (EEPROM); a magnetic card; a flash memory; an optical card; and any type of medium suitable for storing electronic instructions.

What is claimed is:

1. An information processing device associated with a vehicle, the information processing device comprising a processor configured to:
   presume that a person or an item has been left behind in a rear seat of the vehicle, based on a condition being met in which: a rear door was opened and closed in a predetermined period before running of the vehicle and the rear door was not opened and closed in a predetermined period after running of the vehicle;
   perform sensing of the rear seat, using a vehicle sensor, based on the presumption result that an item or a person has been left behind in the rear seat;
   when the sensing result is that an item is in the rear seat, give a first notification to the user using a terminal associated with the user; and when the sensing result is that a person is in the rear seat, give a second notification to the user using a device other than the terminal associated with the user,
wherein the processor is further configured to:
when the sensing result is that the person is in the rear seat, before giving the second notification, further acquire information on a temperature inside a vehicle cabin of the vehicle;
determine whether the temperature inside the vehicle cabin of the vehicle is higher than a predetermined value, based on the information on the temperature inside the vehicle cabin; and
give the second notification when the sensing result is that the person is in the rear seat and the temperature inside the vehicle cabin of the vehicle is higher than the predetermined value.

2. The information processing device according to claim 1, wherein:
the predetermined period before running of the vehicle is a period from when the vehicle is unlocked until the vehicle starts to move; and
the predetermined period after running of the vehicle is a period from when the vehicle is stopped until the vehicle is locked.

3. The information processing device according to claim 1, wherein the processor is configured to perform sensing of the rear seat using a seat sensor mounted in the vehicle.

4. The information processing device according to claim 1, wherein the processor is configured to perform sensing of the rear seat using a camera that captures an image of inside of the vehicle.

5. The information processing device according to claim 1, wherein the device other than the terminal of the user is an alarm of the vehicle.

6. The information processing device according to claim 1, wherein the device other than the terminal of the user is a center server that manages the vehicle.

7. A vehicle, comprising:
a sensor that senses inside of a vehicle cabin of the vehicle; and
a processor configured to:
presume that a person or an item has been left behind in a rear seat of the vehicle, based on a condition being met in which: a rear door was opened and closed in a predetermined period before running of the vehicle and the rear door was not opened and closed in a predetermined period after running of the vehicle,
perform sensing of the rear seat based on the presumption result that an item or a person has been left behind in the rear seat,
when the sensing result of the sensor is that an item is in the rear seat, give a first notification to the user using a terminal associated with the user; and
when the sensing result of the sensor is that a person is in the rear seat, give a second notification to the user using a device other than the terminal associated with the user,
wherein the processor is further configured to:
when the sensing result is that the person is in the rear seat, before giving the second notification, further acquire information on a temperature inside a vehicle cabin of the vehicle;
determine whether the temperature inside the vehicle cabin of the vehicle is higher than a predetermined value, based on the information on the temperature inside the vehicle cabin; and
give the second notification when the sensing result is that the person is in the rear seat and the temperature inside the vehicle cabin of the vehicle is higher than the predetermined value.

8. An information processing method, comprising:
presuming that a person or an item has been left behind in a rear seat of a vehicle, based on a condition being met in which: a rear door was opened and closed in a predetermined period before running of the vehicle and the rear door was not opened and closed in a predetermined period after running of the vehicle;
performing sensing of the rear seat, using a vehicle sensor, based on the presumption result that a person or an item has been left behind in the rear seat;
when the sensing result is that an item is in the rear seat, giving a first notification to the user using a terminal associated with the user; and
when the sensing result is that a person is in the rear seat, giving a second notification to the user using a device other than the terminal associated with the user,
wherein, when the sensing result is that the person is in the rear seat, before giving the second notification, further acquiring information on a temperature inside a vehicle cabin of the vehicle;
determining whether the temperature inside the vehicle cabin of the vehicle is higher than a predetermined value, based on the information on the temperature inside the vehicle cabin; and
giving the second notification when the sensing result is that the person is in the rear seat and the temperature inside the vehicle cabin of the vehicle is higher than the predetermined value.

9. A non-transitory storage medium storing instructions that cause a processor to perform the information processing method according to claim 8.

* * * * *